US012722092B2

(12) United States Patent
Rowbottom et al.

(10) Patent No.: US 12,722,092 B2
(45) Date of Patent: Sep. 1, 2026

(54) HEAT-RESISTANT SLIDE DEVICE

(71) Applicants: Rosetta Geraci Rowbottom, Broadview Heights, OH (US); James Rowbottom, Broadview Heights, OH (US)

(72) Inventors: Rosetta Geraci Rowbottom, Broadview Heights, OH (US); James Rowbottom, Broadview Heights, OH (US)

( * ) Notice: Subject to any disclaimer, the term of this patent is extended or adjusted under 35 U.S.C. 154(b) by 159 days.

(21) Appl. No.: 18/582,821

(22) Filed: Feb. 21, 2024

(65) Prior Publication Data

US 2025/0121294 A1 Apr. 17, 2025

Related U.S. Application Data

(60) Provisional application No. 63/589,343, filed on Oct. 11, 2023.

(51) Int. Cl.

| | |
|---|---|
| ***A63G 21/02*** | (2006.01) |
| ***B32B 1/00*** | (2024.01) |
| ***B32B 7/10*** | (2006.01) |
| ***B32B 15/04*** | (2006.01) |
| ***B32B 27/32*** | (2006.01) |

(52) U.S. Cl.

CPC ................ *A63G 21/02* (2013.01); *B32B 1/00* (2013.01); *B32B 7/10* (2013.01); *B32B 15/04* (2013.01); *B32B 27/32* (2013.01); *B32B 2250/03* (2013.01); *B32B 2307/302* (2013.01); *B32B 2307/306* (2013.01); *B32B 2307/416* (2013.01);

(Continued)

(58) Field of Classification Search

CPC .. A63G 21/02; B32B 1/00; B32B 7/10; B32B 15/04; B32B 27/32; B32B 2250/03; B32B 2307/302; B32B 2307/306; B32B 2307/416; B32B 2307/54; B32B 2307/71; B32B 2307/746; B32B 3/28; B32B 27/18; B32B 2307/734

See application file for complete search history.

(56) References Cited

U.S. PATENT DOCUMENTS 4,932,648 A 6/1990 Ahrens
5,697,851 A * 12/1997 Delgado .................. A63B 9/00 482/35

(Continued)

FOREIGN PATENT DOCUMENTS

EP 2659942 A2 * 11/2013 ............. A63G 31/00

*Primary Examiner* — Michael Zhang
(74) *Attorney, Agent, or Firm* — Brennan, Manna & Diamond, LLC

(57) ABSTRACT

The present invention relates to a heat-resistant slide device designed for community and residential playgrounds. The slide device comprises a triple-layered construction, with a top layer made of High-Density Polyethylene (HDPE) incorporating additives and nano-structured materials for enhanced heat dissipation and UV resistance. A middle layer consists of a thermal conductive matrix for efficient heat transfer and active dissipation, and the bottom layer, made of an alloy or special material, reflects sunlight to contribute to cooling. The slide device can be made in different shapes and sizes and can be integrally or detachably attached to a platform using a pair of connectors. In other embodiments, variable conductivity regions and solar speakers are integrated into the slide device.

11 Claims, 6 Drawing Sheets

(52) U.S. Cl.
CPC ....... *B32B 2307/54* (2013.01); *B32B 2307/71* (2013.01); *B32B 2307/746* (2013.01)

(56) References Cited

U.S. PATENT DOCUMENTS

| | | | |
|---|---|---|---|
| 6,066,050 | A | 5/2000 | Rothbard |
| 8,651,970 | B2 | 2/2014 | Chen |
| 9,427,670 | B2 | 8/2016 | VanDyke |
| 10,391,699 | B2 | 8/2019 | Roberts |
| 2008/0081707 | A1 | 4/2008 | Banta |

* cited by examiner

HEAT-RESISTANT SLIDE DEVICE

CROSS-REFERENCE TO RELATED APPLICATION

The present application claims priority to, and the benefit of, U.S. Provisional Application No. 63/589,343, which was filed on Oct. 11, 2023, and is incorporated herein by reference in its entirety.

FIELD OF THE INVENTION

The present invention generally relates to the field of sliding boards. More specifically, the present invention relates to a novel slide device designed for community and residential playgrounds and features a heat-resistant structure. The device remains cool even when exposed to sunlight or solar energy for an extended period of time. In one exemplary embodiment, the device is made of high-density polyethylene and reflects about 80% of the incident sunlight. The slide device enables children to play on the slide regardless of outdoor temperature and prevents skin burns and irritation due to excessive sunlight exposure on the slide. Accordingly, the present disclosure makes specific reference thereto. Nonetheless, it is to be appreciated that aspects of the present invention are also equally applicable to other like applications, devices, and methods of manufacture.

BACKGROUND

By way of background, children commonly find joy in playing at playgrounds or in backyard settings, particularly during the spring, summer, and fall months. The mild weather during these seasons provides an ideal environment for outdoor activities for children. Slides are popular gathering and playing spots for children at playgrounds. Sliding down a slope on playground slides provides children with exhilaration and excitement. Children become thrilled upon descending from a height on slides which contribute to the overall enjoyment of the play experience. Sliding down a slide also involves physical effort, contributing to children's gross motor skills development. The engagement of large muscle groups during the sliding process helps in building strength and coordination. Slides serve a dual purpose by providing both enjoyable recreation and physical development opportunities.

Slides are commonly constructed using materials such as plastic and metal. These materials are popular choices due to their durability and suitability for outdoor use. However, plastic and metal absorb heat from the sun. When exposed to sunlight, the surfaces of slides made from such materials can become exceptionally hot. Further, both plastic and metal have relatively low thermal conductivity and are not efficient at conducting or transferring heat away from their surfaces.

As a result, hot slides are a potential safety concern for children. Excited children may not be aware of hot slides and lack of awareness may lead to children experiencing severe burns on their skin while attempting to slide down the heated surface. Guardians and authorities cover slides in excessive sunlight to prevent the slides from becoming hot but it is not always possible to cover the slides. Further, it requires effort and time to repeatedly cover and uncover slides. Individuals desire an improved sliding board for children that remains cool even on being exposed to sunlight.

Therefore, there exists a long-felt need in the art for a heat-resistant sliding board for community and residential playgrounds. Additionally, there is a long-felt need in the art for an improved sliding board that stays cool even when the sliding board is exposed to sunlight for an extended period of time. Moreover, there is a long-felt need in the art for a heat-resistant slide for children that prevents skin burns and irritation due to excessive sunlight exposure on the slide. Further, there is a long-felt need in the art for a sliding board that is not required to be covered to prevent it from becoming heated in excessive sunlight. Furthermore, there is a long-felt need in the art for a slide for community and residential playgrounds that enables children to slide regardless of the outdoor temperature and excessive sunlight. Also, there is a long-felt need in the art for a novel slide that is not made of conventional plastic and metal but made of materials that remain cool even in excessive sunlight. Finally, there is a long-felt need in the art for a modified sliding board that remains cool, is not required to be covered, and can be used by children in all types of seasons.

The subject matter disclosed and claimed herein, in one embodiment thereof, comprises a heat-resistant slide device for community and residential playgrounds. The device remains cool in excessive heat to prevent skin burns and irritation due to excessive sunlight exposure on a standard plastic slide. The device features a continuous concave sliding surface extending between a top end and a bottom end. A pair of connecting ports are disposed near the top end for integration or detachable attachment of the slide device to a sliding platform. The slide device is adapted to reflect at least 80% of incident sunlight to remain cool during prolonged exposure to sunlight. The slide device is made of a top HPDE layer, a middle thermal conductive matrix layer, and a bottom structural layer.

In this manner, the heat-resistant slide device of the present invention accomplishes all of the foregoing objectives and provides users with a slide for community and residential playgrounds capable of staying cool despite being exposed to sunlight. The slide device utilizes a high-density plastic material for reflecting sunlight which enables children to play on the slide regardless of outdoor temperature. The slide does not lose shape and structure in constant exposure to sunlight and inclement weather. The slide is not required to be covered in order to prevent it from becoming heated in excessive sunlight.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a heat-resistant slide device for community and residential playgrounds. The device further comprising a continuous concave sliding surface extending between a top end and a bottom end. The concave sliding surface has two longitudinal edges for facilitating balance during sliding from the top end to the bottom end. A pair of connecting ports are disposed near the top end for integration or detachable attachment (i.e., selective attachment) of the slide device to a sliding platform. The slide device is adapted to reflect at least 80% of incident sunlight to prevent excessive heating during prolonged exposure.

In yet another embodiment, a heat-resistant slide device for community and residential playgrounds is disclosed. The slide device has a multi-layered construction and remains cool in excessive sunlight over an extended period of time. The slide device comprising a top layer made of High-Density Polyethylene (HDPE), the top layer incorporates additives and nano-structured materials. A middle layer is made of a thermal conductive matrix which is adapted to facilitate heat transfer, actively dissipate heat, and release cooling agents. A bottom layer for providing structural integrity and shape to the slide device.

In a further embodiment of the present invention, the top layer provides heat dissipation, UV resistance, stability, and longevity under intense sunlight. Also, the top layer has a tensile strength in the range of 20-30 MPa and has resistance to tearing, stretching, and a wide range of chemicals, including acids and alkalis.

In yet another embodiment, the slide device is one of a curved slide, a spiral slide, a wave slide, and a multi-rider slide.

In yet another embodiment, a method for manufacturing a heat-resistant slide device is described. The method includes the steps of preparing High-Density Polyethylene (HDPE) sheets of a desired shape and size using a molding technique and a mold design, accommodating specific features, curves, or angles required for the slide device in the mold design, integrating a thermal conductive matrix and a shape-memory alloy into the HDPE for forming the slide device, smoothing rough edges or imperfections on the slide surface, and testing thermal properties, including the reflectance of sunlight, for the manufactured slide device.

In another aspect of the present invention, a heat-resistant slide device is disclosed. The slide device includes a first slide and a second slide joined along a common edge, the slides are designed using HDPE and reflect up to 90% of the incident sunlight thereon, a plurality of variable conductivity regions included in one or both of the slides, wherein the reflectance of the variable conductivity regions is more than 95% and a solar speaker is integrated into the slide device to engage children in an entertaining sliding experience.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
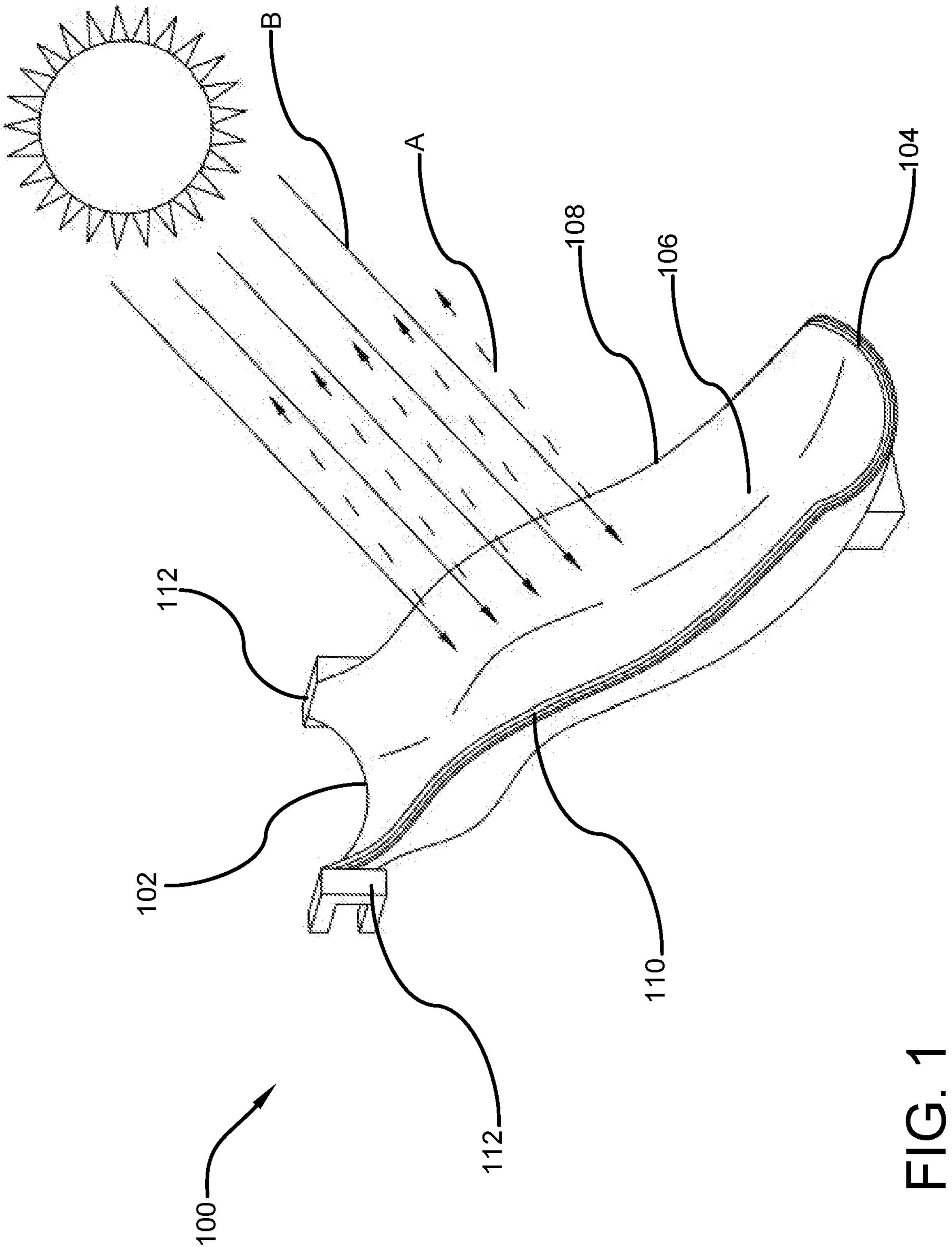
FIG. 1 illustrates a perspective view of one potential embodiment of the heat-resistant slide device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a heat-resistant sliding board for community and residential playgrounds. Additionally, there is a long-felt need in the art for an improved sliding board that stays cool even when the sliding board is exposed to sunlight for an extended period of time. Moreover, there is a long-felt need in the art for a heat-resistant slide for children that prevents skin burns and irritation due to excessive sunlight exposure on the slide. Further, there is a long-felt need in the art for a sliding board that is not required to be covered to prevent it from becoming heated in excessive sunlight. Furthermore, there is a long-felt need in the art for a slide for community and residential playgrounds that enables children to slide regardless of the outdoor temperature and excessive sunlight. Also, there is a long-felt need in the art for a novel slide that is not made of conventional plastic and metal but made of materials that remain cool even in excessive sunlight. Finally, there is a long-felt need in the art for a modified sliding board that remains cool, is not required to be covered, and can be used by children in all types of seasons.

The present invention, in one exemplary embodiment, is a method for manufacturing a heat-resistant slide device. The method includes the steps of preparing High-Density Polyethylene (HDPE) sheets of a desired shape and size using a molding technique and a mold design, accommodating specific features, curves, or angles required for the slide device in the mold design, integrating a thermal conductive matrix and a shape-memory alloy into the HDPE for forming the slide device, smoothing rough edges or imperfections on the slide surface, and testing thermal properties, including the reflectance of sunlight, for the manufactured slide device.

Referring initially to the drawings, FIG. 1 illustrates a perspective view of one potential embodiment of the heat-resistant slide device of the present invention in accordance with the disclosed structure. The heat-resistant slide device 100 is designed as an improved slide for community and residential playgrounds. The improved slide device 100 is adapted to stay cool even when exposed to excessive sunlight for extended periods of time. More specifically, the slide device 100 includes a top C-shaped end 102 and a bottom C-shaped end 104. A continuous concave sliding surface 106 that extends between the top end 102 and the bottom end 104. Two longitudinal edges 108, 110 of the slide device 100 helps children maintaining balance when sliding down from the top end 102 to the bottom end 104.

Figure 2:
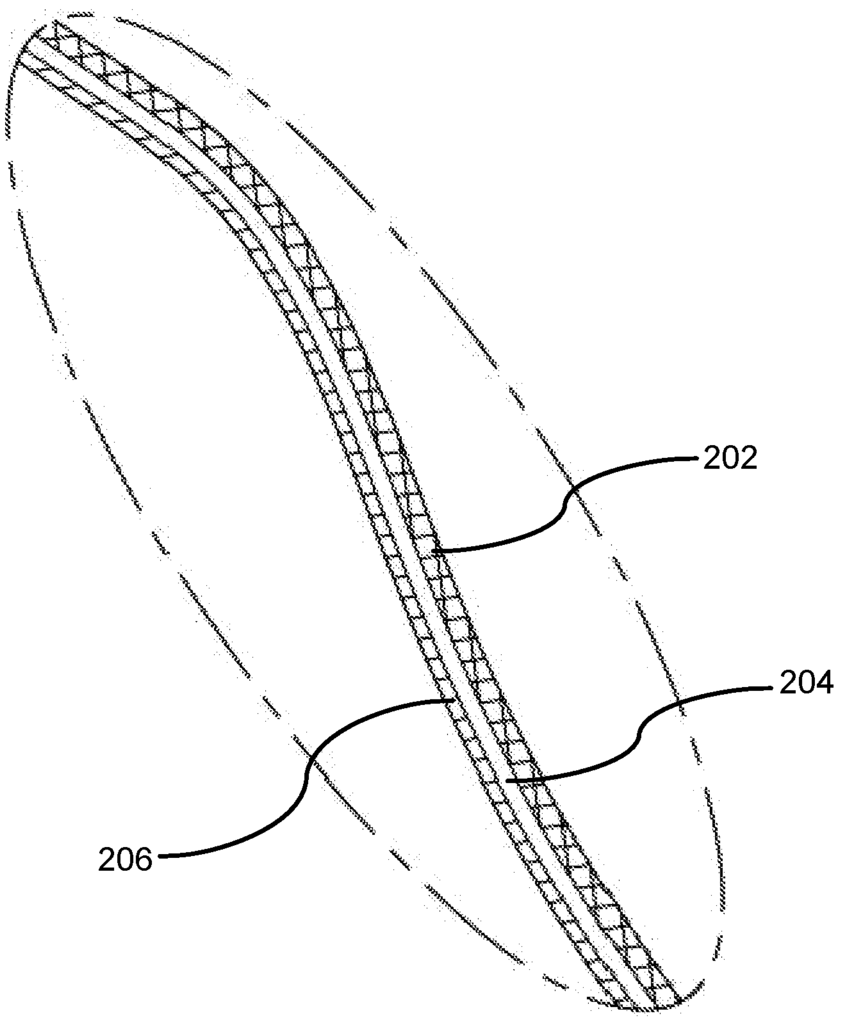
FIG. 2 illustrates a cross-sectional view of the heat-resistant playground slide device of the present invention in accordance with the disclosed structure.
Figure 3:
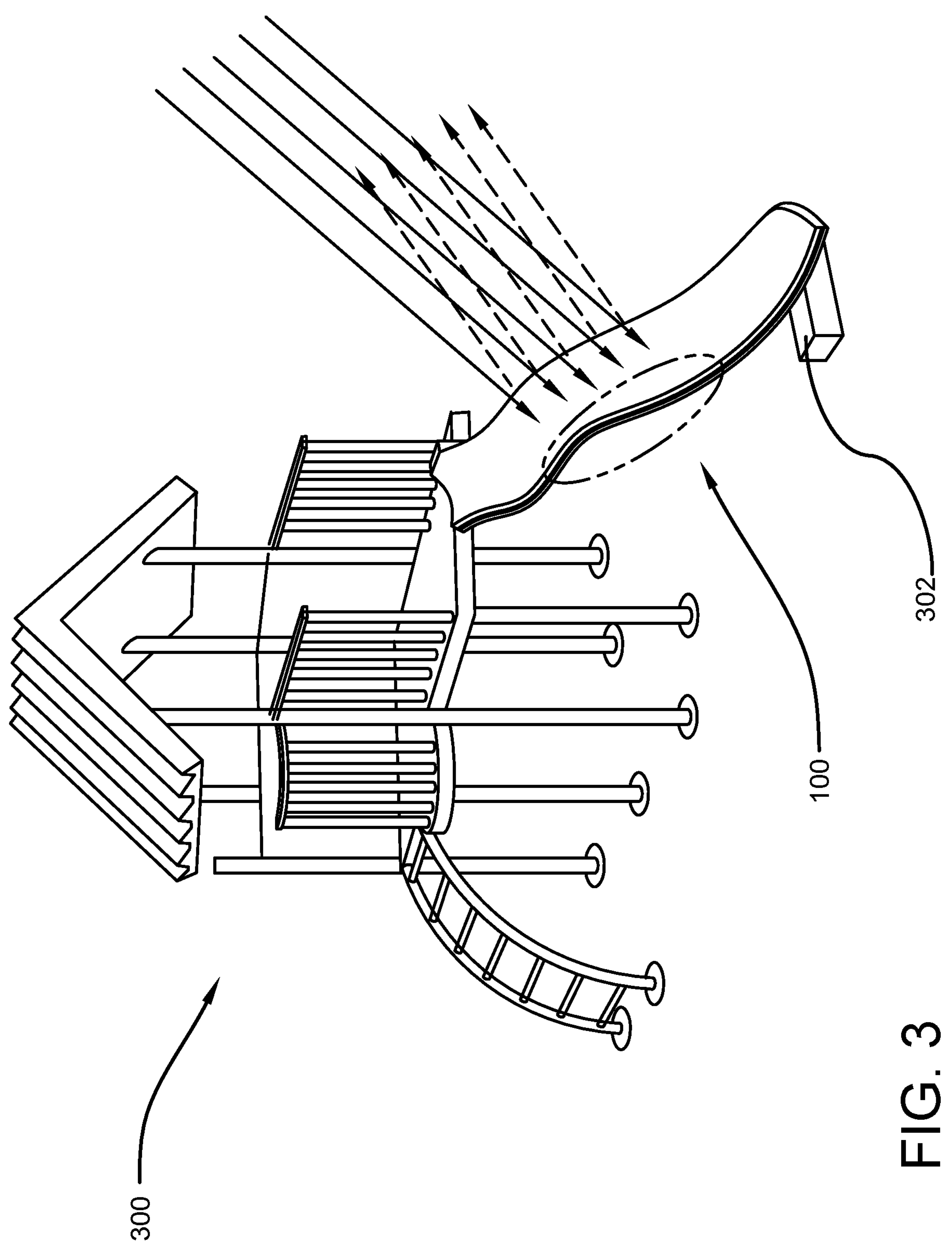
FIG. 3 illustrates a perspective view showing the slide device of FIG. 1 integrated to a sliding platform in accordance with the disclosed structure.

The slide device 100 can be integrated or detachably attached to a sliding platform as illustrated in FIG. 3 using the connecting ports 112. The slide device 100 in the present embodiment is shown as a straight slide but can also be designed as a curved slide, spiral slide, wave slide, multi-rider slides, and more. The slide device 100 is adapted to reflect the sunlight incident thereon for preventing the slide device 100 from becoming heated and thereby enabling children to slide safely without fear of skin burns and irritation. The top surface 114 of the concave sliding surface 106 is made of High-Density Polyethylene (HDPE) as described in FIG. 2, and provides a smooth surface for sliding for children.

In the preferred embodiment, the heat-resistant slide device 100 is adapted to reflect (Arrow A) at least 80% of the incident (Arrow B) sunlight, thereby maintaining the slide device 100 cool even in excessive sunlight. The slide device 100 can be in different colors, preferably light colors, and can be designed for both residential and public playground applications. The slide device 100 can withstand constant exposure to sunlight and inclement weather while maintaining structural integrity.

FIG. 2 illustrates a cross-sectional view of the heat-resistant playground slide device of the present invention in accordance with the disclosed structure. The slide device 100 has a multi-layered structure for providing effective heat resistance to allow the slide device 100 to remain cool. As illustrated, the top layer 202 is made of High-Density Polyethylene (HDPE) and incorporates additives and nano-structured materials. The top layer 202 provides heat dissipation and UV resistance so that the slide 100 remains cool even under intense sunlight. The nanoparticles are preferably UV-resistant nanoparticles which also provide stability and longevity to the slide device 100. The HDPE layer 202 has tensile strength in the range of 20-30 MPa and is resistant to tearing or stretching. Further, the top layer 202 is resistant to a wide range of chemicals, including acids and alkalis.

The middle layer 204 is made of a thermal conductive matrix and is designed to facilitate heat transfer, directing thermal energy away from the slide device and maintaining a consistently cool temperature. The middle layer 204 helps in providing active heat dissipation and release cooling agents to cool the slide device 100.

Figure 6:
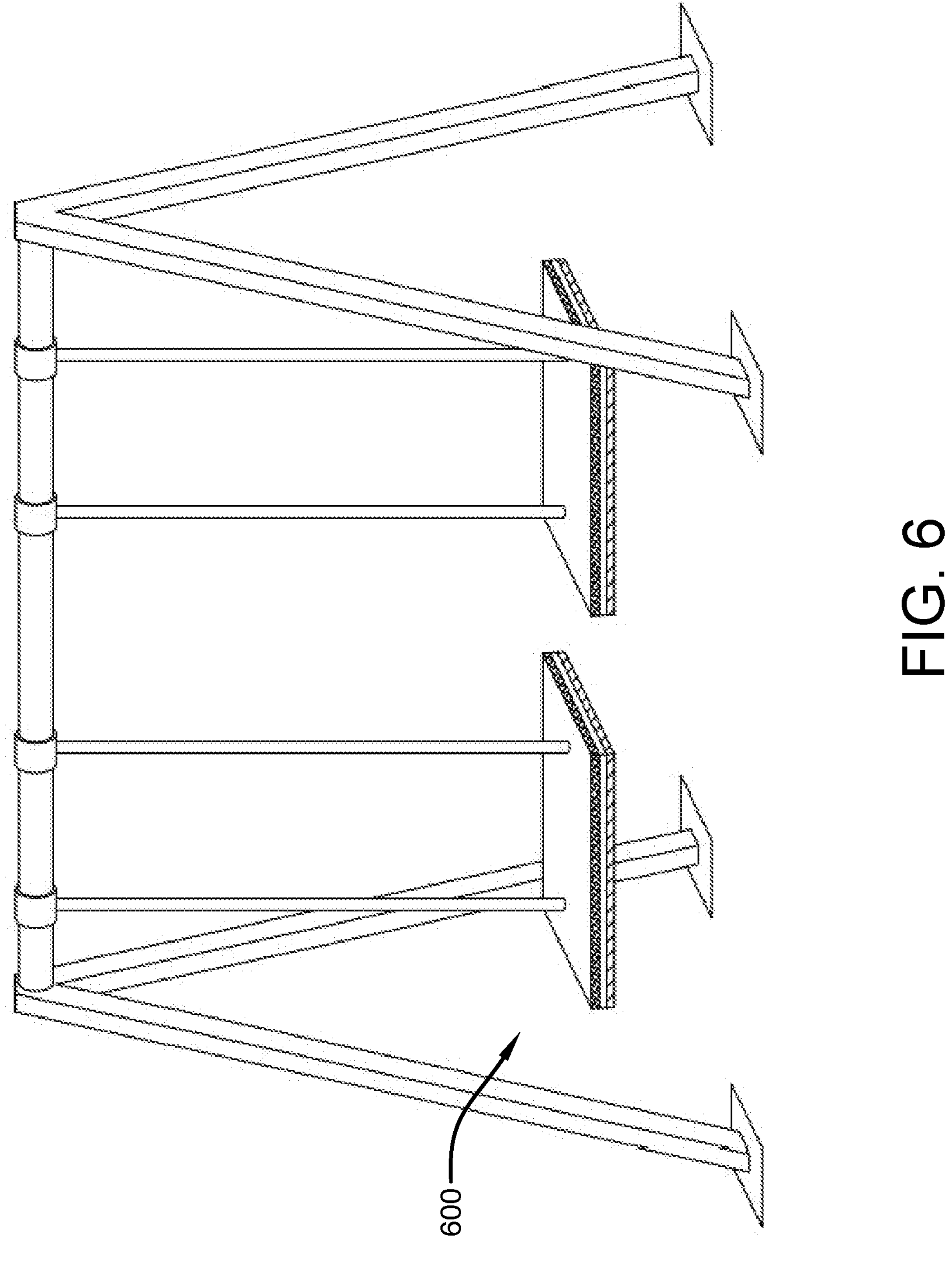
FIG. 6 illustrates a swing made using the multi-layered structure to remain cool in sunlight in accordance with the disclosed structure.

The bottom layer 206 provides a framework to give shape to the slide device 100 and to maintain structural integrity in response to changes in temperature and external forces. An alloy or a special material adapted to reflect sunlight is used for making the bottom layer 206 to contribute to keeping the slide device cool. The same multi-layered structure and the layers can be used for making other types of swings 600 such as illustrated in FIG. 6 of the present invention.

FIG. 3 illustrates a perspective view showing the slide device of FIG. 1 integrated to a sliding platform in accordance with the disclosed structure. The slide device 100 can be detachably attached (i.e., selectively attached) or integrated to the sliding platform 300 of both residential and public playgrounds. The slide device 100 is designed to be used on any platform and can include non-slippery members 302 for providing additional security to the children playing on the slide device 100.

Figure 4:
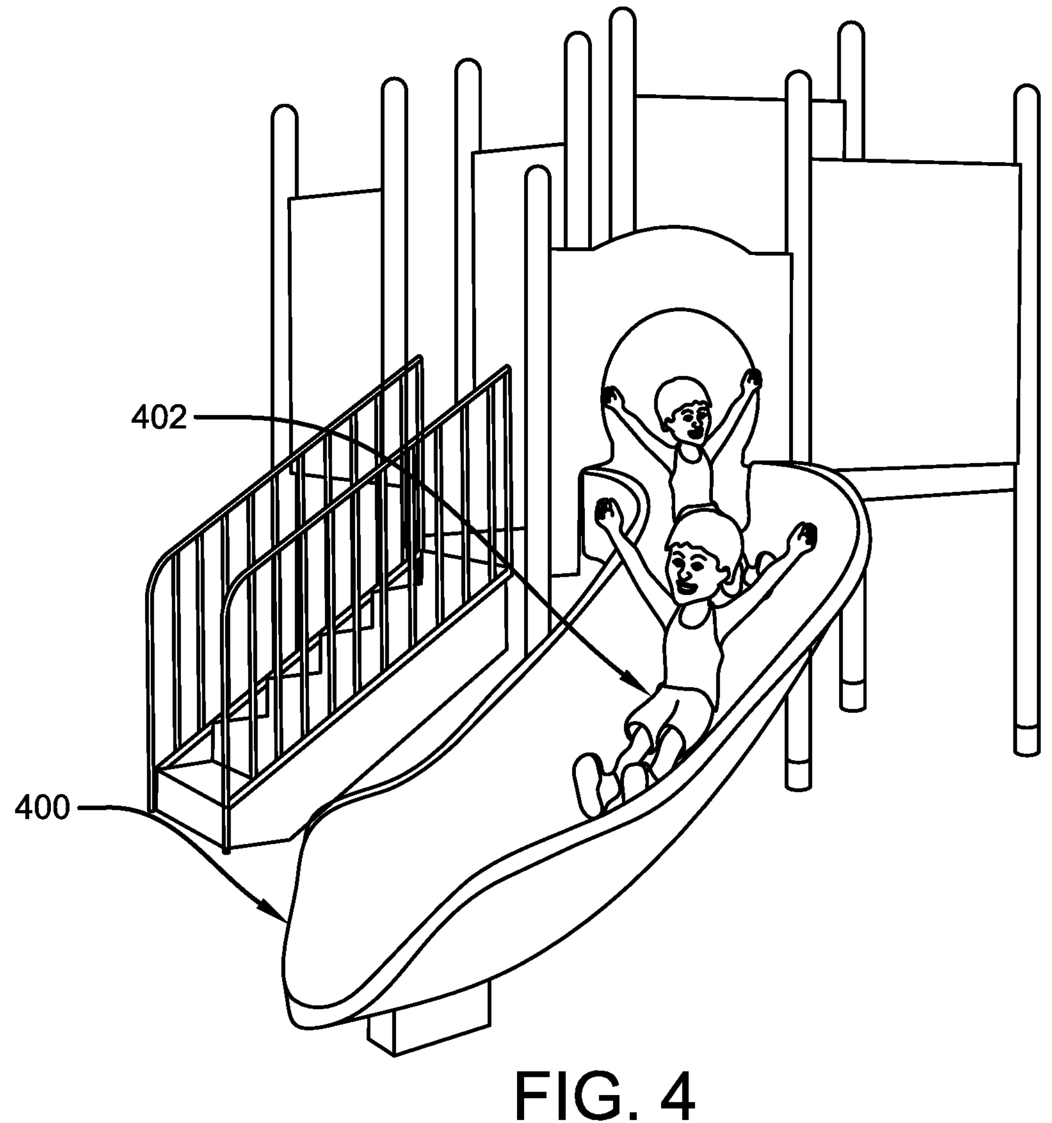
FIG. 4 illustrates a perspective view showing children playing on the slide device of the present invention in accordance with the disclosed structure.

FIG. 4 illustrates a perspective view showing children playing on the slide device of the present invention in accordance with the disclosed structure. As illustrated, children 402 can easily slide on the curved sliding device 400 even in excessive sunlight without fear of skin burns and irritation. The construction of the sliding device 400 is the same as the sliding device 100 of FIG. 1.

Figure 5:
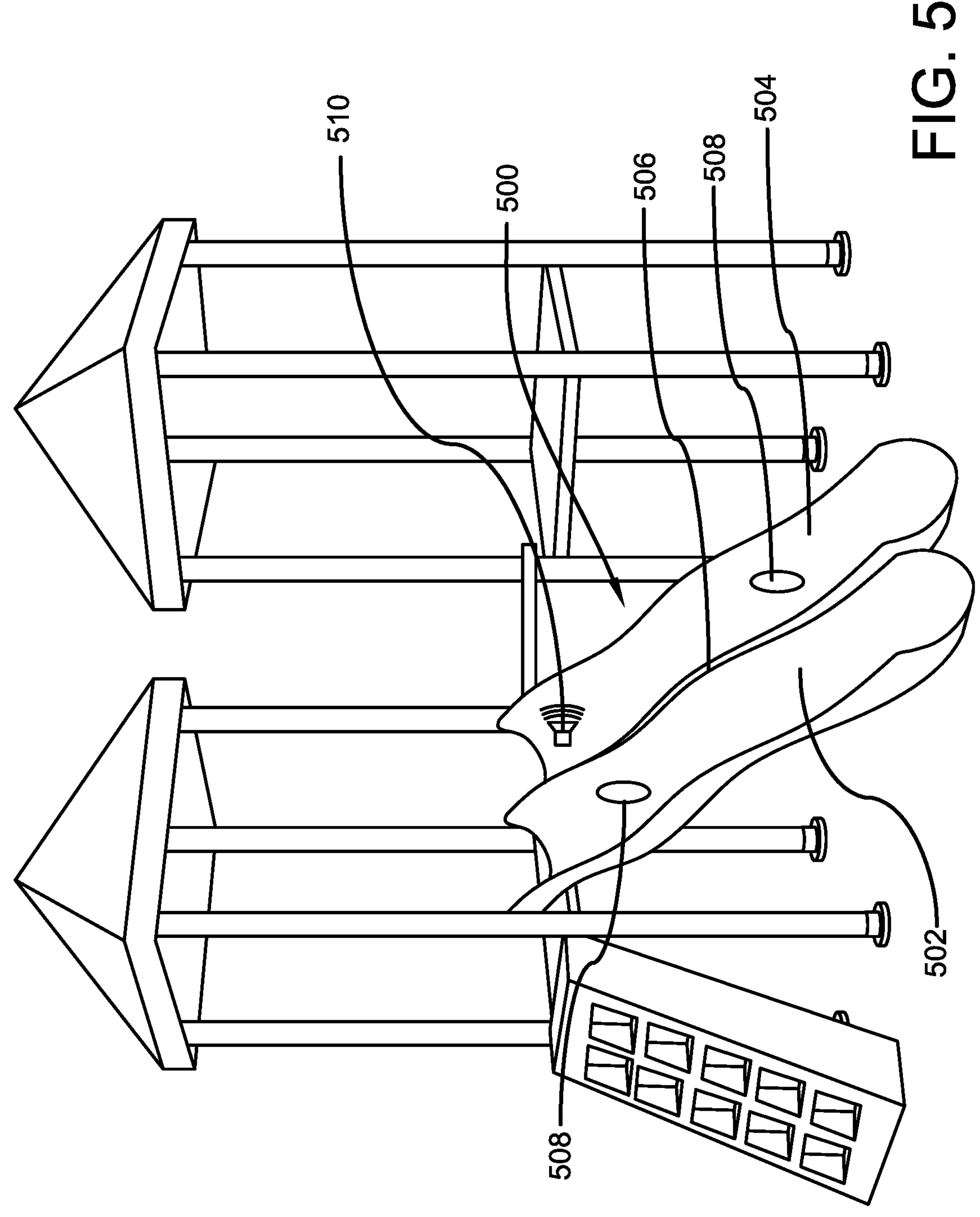
FIG. 5 illustrates another embodiment of the slide device of the present invention in accordance with the disclosed structure.

FIG. 5 illustrates another embodiment of the slide device of the present invention in accordance with the disclosed structure. In the present embodiment, the slide device 500 is in the form of a double slide configuration having a first slide 502 and a second slide 504 which are joined along the common edge 506. Both the slides 502, 504 can be of the same shape and size and remain cool in excessive sunlight over extended periods of time. In one or both the slides 502, 504, variable conductivity regions 508 can be included, wherein the reflectance is more than 95%. A solar speaker 510 can be included in the slide device 500 for engaging children in an entertaining sliding experience.

For manufacturing the slide device of different embodiments of the present invention, initially, HDPE sheets of a desired shape and size are prepared from raw material using a molding technique and a mold design. The mold design can accommodate specific features, curves, or angles required for the slide device. Then, the thermal conductive matrix and the shape-memory alloy are integrated into the HDPE for forming the slide device. Thereafter, rough edges or imperfections on the slide surface are smoothened and thermal properties including reflectance of the sunlight are tested.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "heat-resistant slide device", "improved slide device", "slide device", "sliding board", and "improved slide device" are interchangeable and refer to the heat-resistant slide device 100, 400, 500 of the present invention.

Notwithstanding the foregoing, the heat-resistant slide device 100, 400, 500 of the present invention can be of any suitable size and configuration as is known in the art without affecting the overall concept of the invention, provided that it accomplishes the above-stated objectives. One of ordinary skill in the art will appreciate that the heat-resistant slide device 100, 400, 500 as shown in the FIGS. is for illustrative purposes only, and that many other sizes and shapes of the heat-resistant slide device 100, 400, 500 are well within the scope of the present disclosure. Although the dimensions of the heat-resistant slide device 100, 400, 500 are important design parameters for user convenience, the heat-resistant slide device 100, 400, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A slide device comprising:
a heat-resistant multi-layered slide device comprising:
a top end;
a bottom end;
a first longitudinal edge and an opposing second longitudinal edge;
a continuous concave sliding surface between said top end and said bottom end; and
wherein said top end having a C-shaped opening and said bottom end having a C-shaped opening;
wherein said top end having a first connector port and an opposing second connector port;
wherein said heat-resistant multi-layered slide device is selectively attachable to a sliding platform with said first connector port and said second connector port;
wherein said heat-resistant multi-layered slide device further comprising a top layer, a middle layer, and a bottom layer;
wherein said top layer is configured to be in contact with a user sliding down said slide device;
wherein said heat-resistant multi-layered slide device is selected from the shape consisting of a straight slide, a curved slide, a spiral slide, a wave slide, and a multi-rider slide;
wherein said top layer having a material of High-Density Polyethylene (HDPE);
wherein said middle layer is a thermal conductive matrix for transferring thermal energy away from said top layer; and
further wherein said bottom layer is a shape memory alloy for maintaining structural integrity to said slide device.

2. The slide device of claim 1, wherein said HDPE having a tensile strength from 20 MPa to 30 MPa.

3. The slide device of claim 2, wherein said HDPE is UV resistant.

4. The slide device of claim 3, wherein said HDPE is light reflective of incident sunlight.

5. A slide device comprising:
a heat-resistant multi-layered slide device comprising:
a top end;
a bottom end;
a first longitudinal edge and an opposing second longitudinal edge;
a continuous concave sliding surface between said top end and said bottom end; and
wherein said top end having a C-shaped opening and said bottom end having a C-shaped opening;
wherein said top end having a first connector port and an opposing second connector port;
wherein said heat-resistant multi-layered slide device is selectively attachable to a sliding platform with said first connector port and said second connector port;
wherein said heat-resistant multi-layered slide device having a top layer, a middle layer, and a bottom layer;
wherein said top layer is configured to be in contact with a user sliding down said slide device; and
further wherein said bottom layer is a shape memory alloy for maintaining structural integrity to said slide device.

6. The slide device of claim 5, wherein said heat-resistant multi-layered slide device is selected from the shape consisting of a straight slide, a curved slide, a spiral slide, a wave slide, and a multi-rider slide.

7. The slide device of claim 6, wherein said top layer having a material of High-Density Polyethylene (HDPE).

8. The slide device of claim 7, wherein said middle layer is a thermal conductive matrix for transferring thermal energy away from said top layer.

9. The slide device of claim 8, wherein said HDPE having a tensile strength from 20 MPa to 30 MPa.

10. The slide device of claim 9, wherein said HDPE is UV resistant.

11. The slide device of claim 10, wherein said HDPE is light reflective of incident sunlight.

* * * * *